Figure 1:
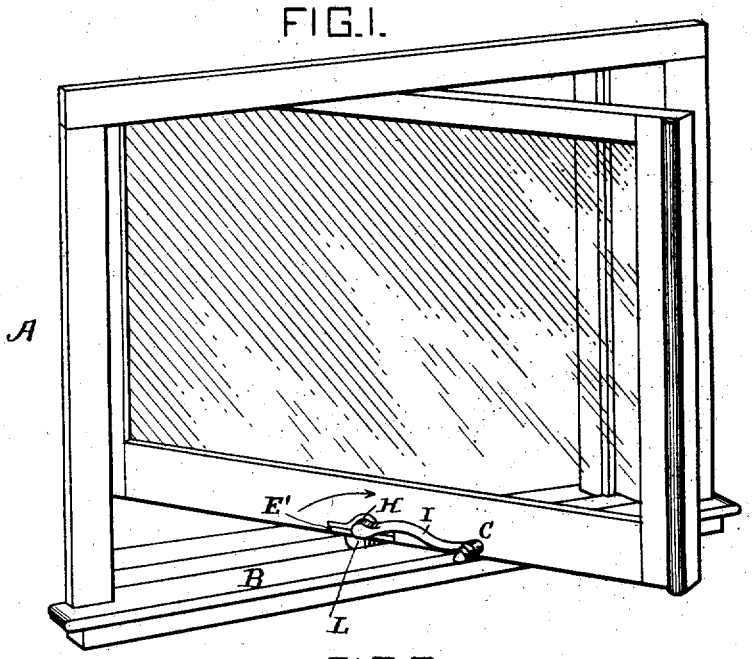

No. 12,405. REISSUED NOV. 7, 1905.

J. H. GIESEY.

WINDOW.

APPLICATION FILED NOV. 10, 1904.

2 SHEETS—SHEET 1.

WITNESSES:
Herbert Smalley.
Fred Wirchner.

INVENTOR
James H. Giesey,
by Christy & Christy, Att'ys

No. 12,405. REISSUED NOV. 7, 1905.

J. H. GIESEY.

WINDOW.

APPLICATION FILED NOV. 10, 1904.

2 SHEETS—SHEET 2.

WITNESSES:
Herbert Bradley.
Fred Kirchner.

INVENTOR
James H. Giesey,
by Christy & Christy, Att'ys

UNITED STATES PATENT OFFICE.

JAMES H. GIESEY, OF PITTSBURG, PENNSYLVANIA.

WINDOW.

No. 12,405. Specification of Reissued Letters Patent. Reissued Nov. 7, 1905.

Original No. 488,761, dated December 27, 1892. Application for reissue filed November 10, 1904. Serial No. 232,240½.

*To all whom it may concern:*

Be it known that I, JAMES H. GIESEY, a citizen of the United States, residing at Pittsburg, in the county of Allegheny and State of Pennsylvania, have invented certain new and useful Improvements in Windows; and I do hereby declare the following to be a full, clear, and exact description of the invention, such as will enable others skilled in the art to which it appertains to make and use the same.

My invention relates to certain new and useful improvements in windows for dwellings and other buildings, and particularly to that class of windows which are pivoted vertically and adapted to rotate into an open or closed position.

Prior to my invention, so far as I am aware, pivoted windows have been so constructed and normally arranged with reference to the sill that the sash in its rotary movement has always moved in a plane slightly above the plane of the window-sill, and consequently a neat or weather-tight joint could not be made. Efforts to overcome this inherent disadvantage have been suggested, consisting in providing the sill with a molding or strip adjacent to that half of the sash which in its rotary movement traveled away from the inside of the sill; but a concomitant disadvantage of this arrangement laid in the fact that the molding or strip formed a check against the rotation of the sash beyond one-half of a complete circle, and consequently great difficulty has been experienced in cleaning the outside surface of the window, and the further disadvantage has existed in the fact that that half of the sill which of necessity was devoid of the molding or strip was in a condition to admit between it and the window-sash wind, dirt, and rain, another disadvantage of the construction referred to lying in the fact that the entire weight of the sash is at all times exerted upon the central lower vertical pivots and a consequent sagging of the same takes place each side of said pivot to such an extent that the sill is marred and defaced by the rotary movement of the sash. There has also been suggested in the type of windows made up of two wings respectively hinged to opposite sides of the frame and opening and closing like a door an arrangement in which one of the swinging wings is capable of a slight vertical movement on its hinges and is provided with a tension-spring which tends to hold it in elevated position. In order to hold the window closed in its lowered position, a lock is provided which must be engaged with the sill in order to resist and overcome the elevating force which is constantly exerted by the tension of the spring.

My invention has for its objects to overcome all the defects and disadvantages above stated and to secure in a pivoted sash all the advantages which are inherent in an ordinary vertically-movable sash.

In order that those skilled in the art to which my invention appertains may fully understand the same, I will proceed to describe its construction, arrangement, and mode of operation, referring by letters to the accompanying drawings, in which—

Figure 2:
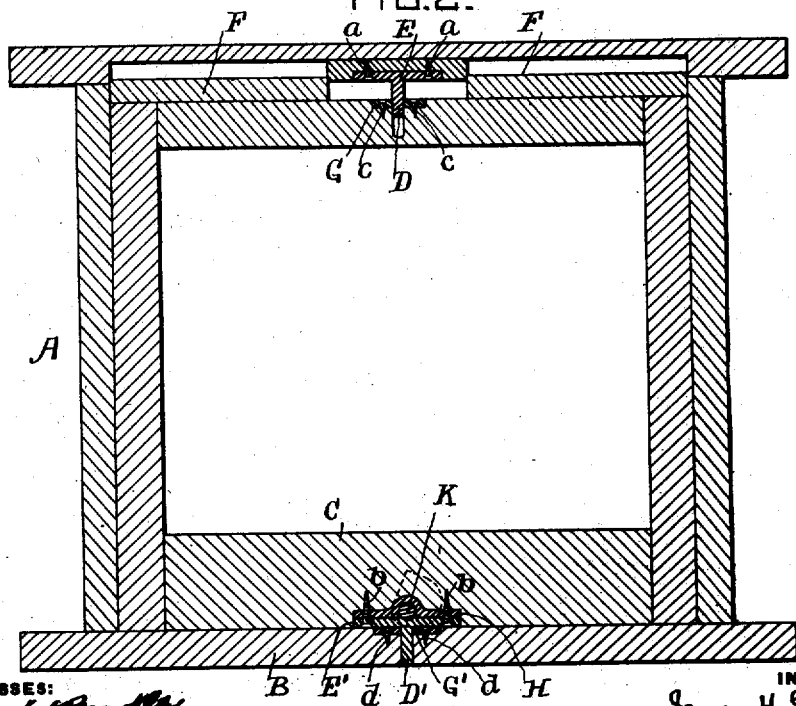
Figure 3:
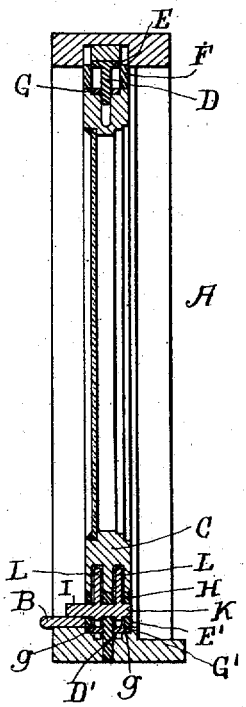
Figure 5:
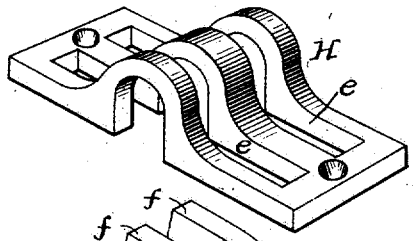
Figure 7:
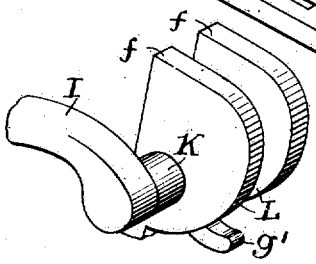
Figure 6:
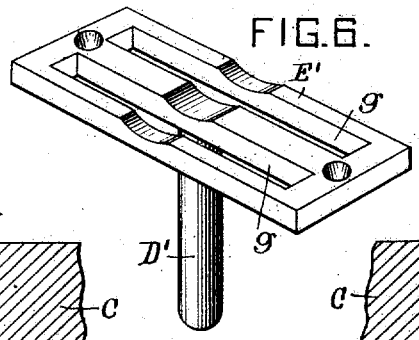
Figure 4:
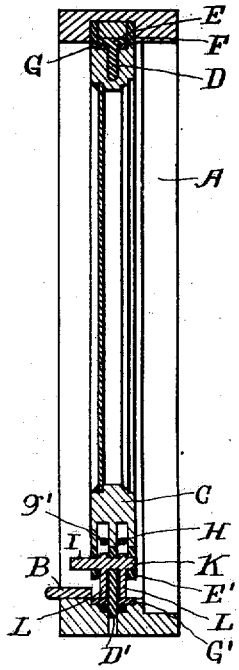
Figure 8:
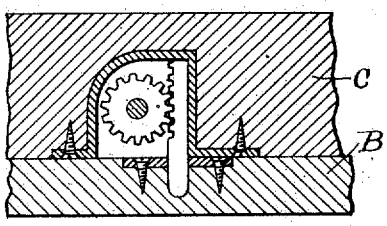
Figure 9:
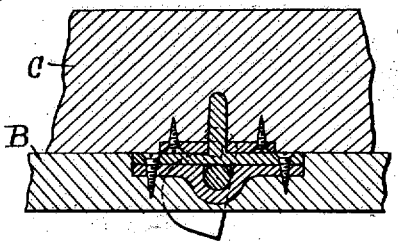
Figure 10:
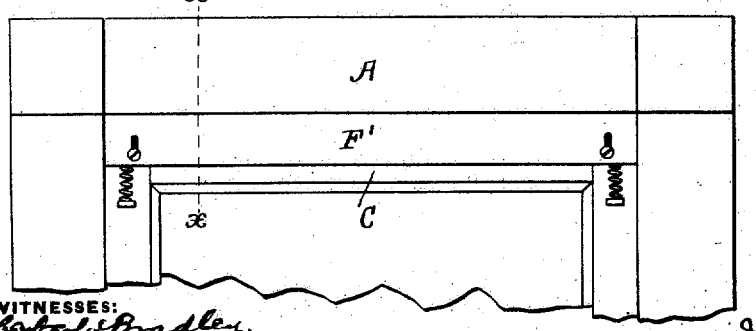
Figure 11:
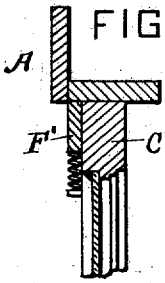

Figure 1 is a perspective view of a centrally-pivoted horizontally-swinging sash and frame embodying my invention. Fig. 2 is a central vertical section. Fig. 3 is a transverse vertical section, showing the sash in closed position in the rabbet of the sill. Fig. 4 is a similar view showing the sash elevated into position ready to be rotated. Fig. 5 is a perspective view of the casting or box designed to receive the lifting device. Fig. 6 is a perspective view of the lower pivot and plate. Fig. 7 is a similar view of the lifting device with the lever or arm broken off. Fig. 8 is a detail sectional view showing a modification of the lifting device. Fig. 9 is a partial sectional detail view showing the lifting device located in the sill instead of the sash. Fig. 10 is a partial front elevation showing a modification of the means for closing the space at the top between the sash and the frame, and Fig. 11 is a vertical cross-section at line *x x* of Fig. 10.

Similar letters of reference indicate like parts in the several figures of the drawings.

A represents an ordinary window-frame with the sill B provided with a rabbet or seat for the lower rail of the sash C, as is customary in the construction of windows in which the sash is raised and lowered to open and close the window, this seat or rabbet in the sill being essentially necessary to form a guard against the entrance of wind, dirt, and rain when the window is closed. The sash C is swung centrally upon vertical pivots D D′. The upper one, D, is formed integral with a rectangular plate E, and the latter is secured to the frame by screws *a*. The lower pivot D′ is formed integral with a plate E′, which plate is secured by screws *b* in a mortise on the under side of the lower rail of the sash and formed with two longitudinal channels

*g g* to permit of the movement, hereinafter described, of the eccentrics. The sash is made less than the length of the opening in the frame, and consequently when the lower rail of the sash is properly seated upon the sill or in the rabbet thereof the upper rail of the sash will be below the under side of the upper part of the frame, and to close the space thus created I provide an ordinary "follower" F, which rests upon the upper rail of the sash and is lifted thereby when the sash is raised and falls by gravity when the sash is lowered. This follower is mortised out centrally to surround the upper pivot-plate D when the said follower is lifted, as is clearly shown at Fig. 2.

G is a plate mortised in the upper rail of the sash and secured by screws *c* and forms a guide and circumferential support for the upper pivot D, and G′ is a similar plate secured by screws *d* within a mortise in the sill B to similarly guide and support the lower pivot D′.

Above the lower pivot-plate E and within a mortise in the lower rail of the sash is located a casting H, which is secured in place by the same screws *b* which secure the plate E′. This casting H is cored out centrally, as clearly shown, and when in position forms with the plate E′ a journal-box for the shaft of the lifting device to be presently explained. The casting H is also formed with two longitudinal channels *e e* to receive and guide the eccentrics employed to lift the sash.

The lifting device consists, preferably, of a single casting composed of an arm or lever I, journal K, and preferably two eccentrics L, so that said eccentrics will straddle or lie one each side of the lower pivot D′ when in place. In locating the lifting device the journal K thereof is placed within the cored-out portion or box in the casting H, and the plate E′ is then put in place to confine the journal, the eccentrics L L being arranged within the channels *e e*, and the parts thus adjusted are secured within the mortise in the lower rail of the sash by the screws *b*. It will be seen that the lifting portions of the eccentrics L terminate in substantially straight feet at *f*, so that after the cam-face portions of the eccentrics when rotated by the lever I have lifted the sash away from the sill to the extreme limit of movement the straight foot portions *f* will rest upon the guiding-plate G′, and prevent the sash from dropping and the journal K from accidental rotation, and when in this position the lower edge of the sash is sufficiently far above the sill of the frame to permit the former to be freely rotated to open the window. When the sash is closed and the eccentrics are returned to their normal position, the extensions or nose portions *g′ g′* swing under the solid portion of the plate G′ and thus form a substantial and strong sash-lock which prevents the lifting and rotation of the sash unless the lifting device on the inside of the sash be first operated. If the locking device be thought unnecessary, the eccentrics L L may be made without the extensions *g′ g′*; but I prefer to make them as described.

In lieu of the lifting device described I may employ any other suitable lifting device—such, for instance, as the modification shown at Fig. 8—consisting of a rack and pinion, and though I prefer the one fully described I do not wish to be limited in that particular. The casting constituting the lifting device should of course be proportioned to the weight it is designed to lift, and, if thought desirable, the lever may be cast separate from the journal and eccentrics and adapted to fit a square head formed on the journal.

In lieu of the follower F the upper rail of the sash may be provided with a spring-strip F′, (shown at Figs. 10 and 11,) the springs tending to keep the upper edge of the strip always in contact with the under side of the upper part of the frame A, or any other suitable means may be employed for closing the space between the sash and frame. It will also be understood that in lieu of arranging the lifting devices within a recess or mortise in the lower rail of the sash they may be reversed and placed within the sill, though I prefer to arrange them as described and illustrated.

Having described the construction and arrangement of the several parts of my improved window, I will now proceed to describe the operation of the same. The window being in a closed condition and it being desired to open the same, the lever I is turned to the right, as indicated by the arrow, until the journal K has rotated sufficiently far for the eccentrics to lift the sash free from the rabbet in the sill and for the feet or straight portions of the eccentrics to rest upon the plate G′, during which movement the follower F has been lifted up into its pocket or box in the upper portion of the frame A. The sash may now be freely rotated upon its vertical pivots D D′ at any angle to the natural plane of the window and to such an extent that the outside surface of the sash (or glass) is readily accessible from the inside for the purpose of cleaning the same. When it is desired to restore the sash to its closed position, it is rotated in a reverse direction until it reaches its normal plane within the frame. The lever I is then thrown back and the weight of the sash causes it to descend within the rabbet in the sill and to rest with its entire weight throughout its entire width upon the sill, and, as the sash in ordinary use is for a greater portion of the time closed, it will be seen that its own weight operates to keep it in true and stiff condition, thus avoiding the sagging or distortion occurring in pivoted windows as ordinarily constructed.

While I have herein illustrated and described the means which I prefer for carrying out my said invention, it is obvious that other and equivalent means may be employed for that purpose, and I therefore do not limit the scope of my said invention further than as defined in the claims hereto appended.

What I claim as new, and desire to secure by Letters Patent, is—

1. The combination with a window-frame, and a centrally-pivoted horizontally-swinging window-sash of less height than the frame-space and movable vertically therein, of means for closing the opening between the sash and frame, and means for positively elevating the sash, substantially as described.

2. The combination with a window-frame, of a centrally-pivoted horizontally-swinging window-sash of less height than the frame-space and movable vertically therein, and means movable vertically by and with the sash for closing the opening between the sash and frame, substantially as described.

3. A window-sash pivoted within the frame and also movable vertically therein, said sash being of less height than the frame-space, and having means for closing the opening between the sash and frame, in combination with a lifting device composed of a lever, rotating journal and eccentrics, substantially as described.

4. In combination with the sash the lifting device consisting of a suitable casting or box H, the lever I, journal K and eccentrics L, moving through slots in casting H, substantially as described.

5. In combination with the sash the casting or box H provided with a bearing-surface for the journal and formed with longitudinal channels *e* to receive and guide the eccentrics, and said eccentrics, substantially as described.

6. In combination with the sash the lifting device having the eccentrics L formed with an extension *g'* in combination with the slotted plate G' secured to the sill, whereby the sash may be locked, substantially as described.

In testimony whereof I affix my signature in presence of two witnesses.

JAMES H. GIESEY.

Witnesses:
MARSHALL A. CHRISTY,
CHARLES BARNETT.